(12) United States Patent
Coutts et al.

(10) Patent No.: US 10,947,140 B2
(45) Date of Patent: Mar. 16, 2021

(54) METHOD FOR ESTABLISHING A WASTEWATER BIOREACTOR ENVIRONMENT

(71) Applicant: Craig Technical Consulting, Inc., Merritt Island, FL (US)

(72) Inventors: Janelle Coutts, Kennedy Space Center, FL (US); Griffin Lunn, Kennedy Space Center, FL (US); Tracy Gibson, Kennedy Space Center, FL (US)

(73) Assignee: Craig Technical Consulting, Inc., Merritt Island, FL (US)

( * ) Notice: Subject to any disclaimer, the term of this patent is extended or adjusted under 35 U.S.C. 154(b) by 100 days.

(21) Appl. No.: 16/378,664

(22) Filed: Apr. 9, 2019

(65) Prior Publication Data

US 2019/0308895 A1    Oct. 10, 2019

Related U.S. Application Data

(60) Provisional application No. 62/654,949, filed on Apr. 9, 2018.

(51) Int. Cl.
| | |
|---|---|
| C02F 3/00 | (2006.01) |
| C02F 3/10 | (2006.01) |
| C02F 3/12 | (2006.01) |
| D01F 11/08 | (2006.01) |
| D01F 6/76 | (2006.01) |

(52) U.S. Cl.
CPC .............. *C02F 3/105* (2013.01); *C02F 3/006* (2013.01); *C02F 3/1268* (2013.01); *D01F 6/76* (2013.01); *D01F 11/08* (2013.01); *C02F 2209/06* (2013.01); *C02F 2209/14* (2013.01); *C02F 2209/15* (2013.01)

(58) Field of Classification Search
None
See application file for complete search history.

(56) References Cited

U.S. PATENT DOCUMENTS

| | | | |
|---|---|---|---|
| 2,469,890 A | * | 5/1949 | Patnode ................ C07F 7/0874 556/456 |
| 2013/0233786 A1 | * | 9/2013 | Posa .................... E21B 21/063 210/259 |
| 2018/0327715 A1 | * | 11/2018 | Espinosa-Hoyos ........................ B29C 64/135 |
| 2019/0022592 A1 | * | 1/2019 | Choi ...................... B01D 65/08 |
| 2019/0046690 A9 | * | 2/2019 | Vegas ........................ C08J 7/12 |
| 2019/0176090 A1 | * | 6/2019 | Lee .......................... B01D 69/02 |
| 2019/0217253 A1 | * | 7/2019 | Syron ..................... B01D 65/08 |

* cited by examiner

*Primary Examiner* — Chester T Barry
(74) *Attorney, Agent, or Firm* — Mark Malek; Kelly G. Swartz; Widerman Malek, PL

(57) ABSTRACT

A method for establishing a wastewater bioreactor environment including the step of introducing a modified polydimethylsiloxane fiber to a bioreactor tank of a membrane-aerated bioreactor.

19 Claims, 11 Drawing Sheets

FIG. 1B

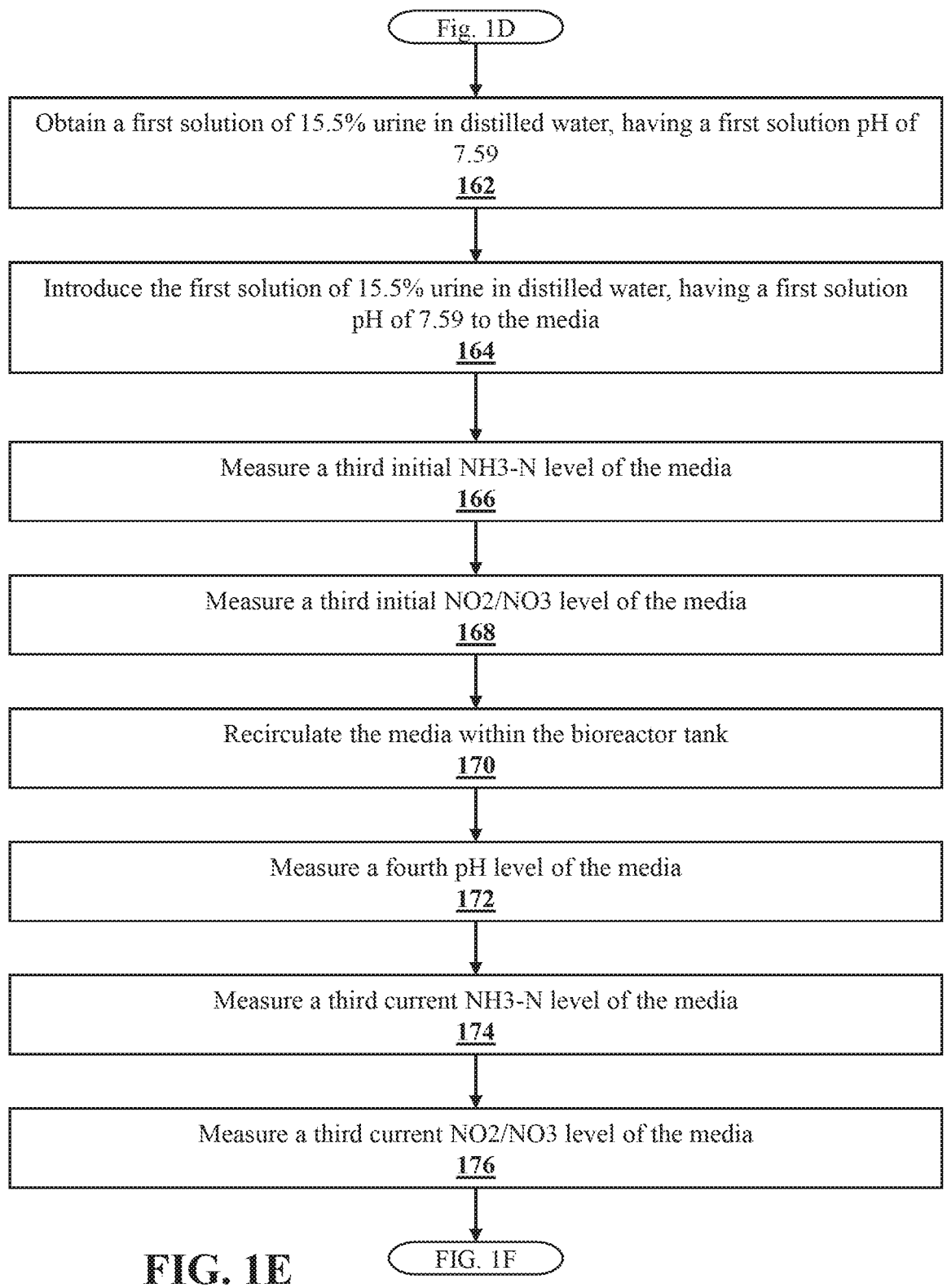

```
                          ┌─────────────┐
                          │   Fig. 1E   │
                          └──────┬──────┘
                                 ▼
```

Iteratively repeating the steps of recirculating the media within the bioreactor tank, measuring the fourth pH level of the media, measuring the third current NH3-N level of the media, and measuring the third current NO2/NO3 level of the media until one of the following occurs
178

(a) the fourth pH level of the media is less than 6.5 and the third current NH3-N level of the media is less than the third initial NH3-N level of the media or (b) the fourth pH level of the media is less than 6.5 and the third current NO2/NO3 level of the media is greater than the third initial NO2/NO3 level of the media
180

Obtain a second solution of 15.5% urine in distilled water, having a second solution pH of 5.05
182

Introduce the second solution of 15.5% urine in distilled water, having a second solution pH of 5.05 to the media
184

Measure a fourth initial NH3-N level of the media
186

Measure a fourth initial NO2/NO3 level of the media
188

Recirculate the media within the bioreactor tank
190

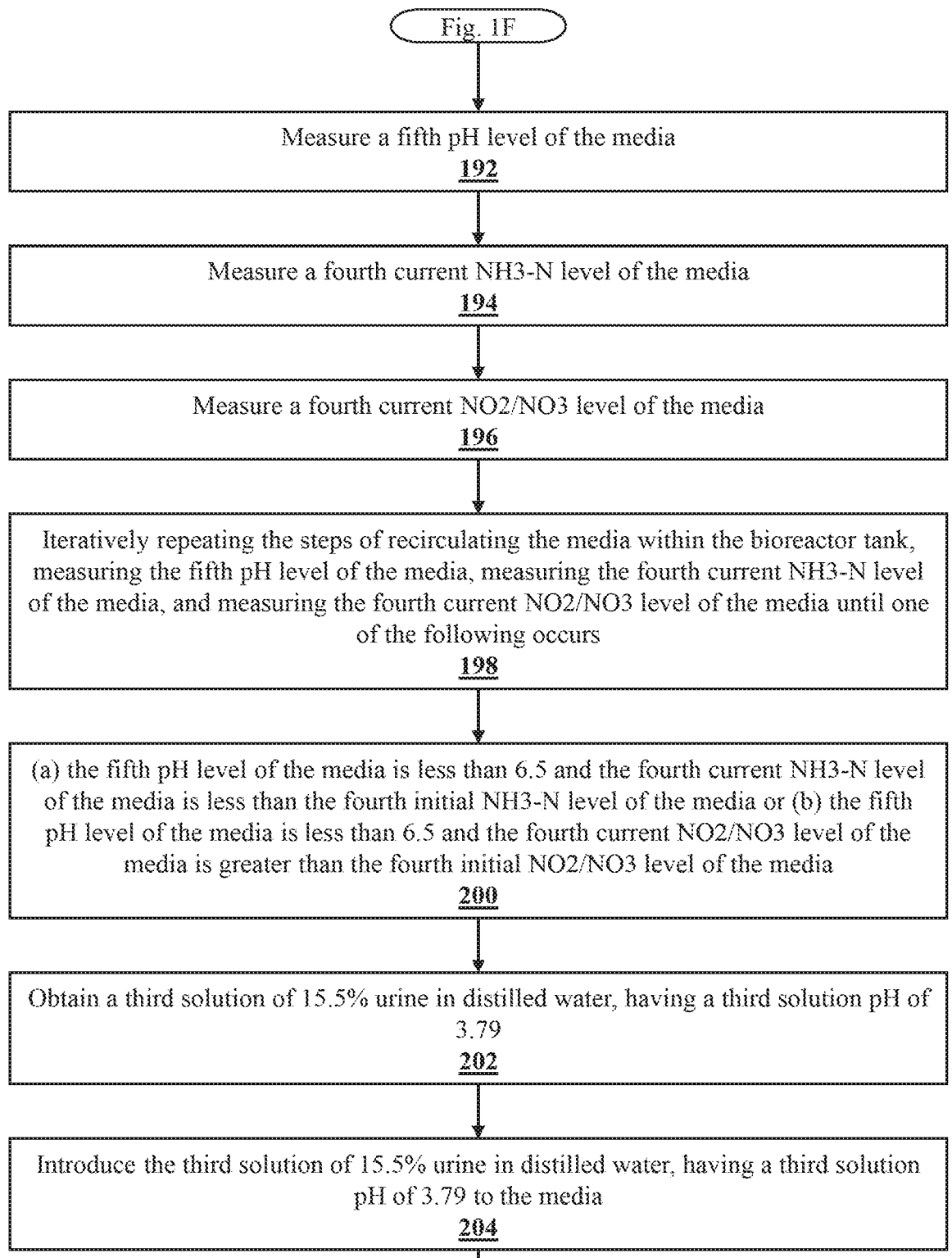

100

103 — Obtain a membrane-aerated bioreactor comprising a bioreactor tank.

102 — Obtain a polydimethylsiloxane fiber.

105 — Modify the polydimethylsiloxane fiber by one of the following methods:
    a. mechanical abrasion;
    b. etching with:
        1. hydrofluoric acid,
        2. sulfuric acid,
        3. sodium-based solution, or
        4. hydrogen peroxide;
    c. coating;
    d. applying a scaffolding material of:
        1. nylon cable sheath,
        2. silk thread,
        3. cotton thread, or
        4. spider silk.

104 — Introduce the modified polydimethylsiloxane fiber to the bioreactor tank.

FIG. 2

METHOD FOR ESTABLISHING A WASTEWATER BIOREACTOR ENVIRONMENT

RELATED APPLICATIONS

This application claims the benefit under 35 U.S.C. § 119(e) of U.S. Provisional Patent Application Ser. No. 62/654,949 titled Modification of Polydimethylsiloxane Using Sodium Naphthalate to Increase Biofilm Attachment for Membrane Aerated Bioreactors filed on Apr. 9, 2018, the entire content(s) of which is/are incorporated herein by reference

GOVERNMENT INTEREST

The invention described herein was made in the performance of work under a NASA contract NNK11EA08C and by employees of the United States Government and is subject to the provisions of Public Law 96-517 (35 U.S.C. § 202) and may be manufactured and used by or for the Government for governmental purposes without the payment of any royalties thereon of therefore.

FIELD OF THE INVENTION

The present invention relates to systems and methods for wastewater treatment or other bio-catalysis using microbial attachment on silicone (aerobic bioreactions). More specifically, the present invention is related to a novel chemical treatment to modify hydrophobic PDMS hollow fibers to accept microbial colonization in hollow fiber membrane bioreactors.

BACKGROUND

A key challenge in the use of membrane aerated biofilm reactors (MABRs) for wastewater remediation has always been the development and maintenance of a biofilm on the membrane surface. To achieve a robust and stable MABR, biofilm development must be rapid and structurally compatible with the MABR application both in terms of thickness and resistance to shearing.

Membranes used in MABR studies fall into three categories: microporous membranes such as polytetrafluoroethylene (PTFE), dense membranes such as polydimethylsiloxane (PDMS; silicones), or a composite consisting of a microporous membrane coated with a thin layer of dense membrane material. While silicone membranes are not readily available with wall thicknesses comparable to microporous membranes, they do allow for improved oxygen permeation, higher operating intramembrane oxygen pressures, and greater resistance to chemical and mechanical stress. PDMS fibers have been utilized in operating reactors because of these advantages.

Nitrifying bacteria, those responsible for the conversion of ammonium to nitrate within bioreactors, are notoriously difficult to establish and maintain on bioreactor membranes. The problem lies in their low fecundity and limited production of extracellular polymeric substances; the compounds required for adhesion to surfaces. The vast majority of studies examining biofilm structure and development focus on preventing rather than enhancing establishment of biofilms, primarily to address medical and industrial concerns with biofilm development. Only in recent years have studies examining techniques to promote biofilm attachment surfaced for use of such technology in wastewater treatment facilities.

Most alterations made to membrane surfaces for improving bacterial adhesion involve chemical alterations of the polymer surface; i.e., surface modification based on adding various chemical functional groups to the fiber surface. Bacterial attachment to a surface structure can be approximated based on surface thermodynamic properties including surface wettability and surface free energy. Many studies relate bacterial attachment to surface hydrophobicity, which is directly related to surface free energy; while some investigations have shown similar attachment dynamics on both hydrophobic and hydrophilic surfaces, others have demonstrated that maximum attachment occurs at medial values of surface hydrophobicity.

It is important to note that it is not only the surface hydrophobicity which plays a role in bacterial attachment, but also the cell surface hydrophobicity. Increased cell surface hydrophobicity has been observed to favor cell adhesion on hydrophilic surfaces and can be related to the difference in surface free energy of the membrane material and cell envelope. Surface roughness, which lowers the surface free energy of a material, may also have an effect on adhesion. However, it is difficult to separate this from other factors influencing surface free energy and hydrophobicity.

Even a cursory review of the available prior art quickly reveals a paucity of information on the alteration of PDMS fibers for improved bacterial adhesion. The majority of membrane modification studies to date have focused on polyethylene (PE) and polypropylene (PP) fibers. Therefore, there exists a need for modification of PDMS fibers to support rapid attachment and startup of MABR systems. There exists a particular need for the concurrent establishment and adhesion of both heterotrophic carbon oxidation bacterial cells and autotrophic nitrifying bacterial cells. There exists a need to determine the range and combination of chemical and mechanical treatments to provide uniform adhesion and biofilm development in mixed cell cultures having a variation between species of cell membrane hydrophobicity, growth rates, and adhesion efficiency.

SUMMARY OF THE INVENTION

With the above in mind, embodiments of the present invention are related to a method for establishing a wastewater bioreactor environment including the step of introducing a modified polydimethylsiloxane (PDMS) fiber to a bioreactor tank of a membrane-aerated bioreactor.

The PDMS fiber may be hollow before or after modification.

The PDMS fiber may be mechanically abraded, etched, coated, or at least partially covered with a scaffolding material to create the modified PDMS fiber.

In embodiments in which the PDMS fiber is etched, the etching may be performed using one or more of hydrofluoric acid, sulfuric acid, sodium-based solution, or hydrogen peroxide.

In embodiments in which the PDMS fiber is at least partially covered with a scaffolding material, the scaffolding material may be nylon cable sheaths, silk thread, cotton thread, or spider silk.

The wastewater bioreactor may go through a startup process including the steps of:
 a) obtaining a membrane-aerated bioreactor comprising a bioreactor tank;
 b) obtaining a modified polydimethylsiloxane fiber;

c) obtaining a feed material;
d) providing a media to the bioreactor tank;
e) providing the feed to the media in the bioreactor tank;
f) iteratively repeating the step of measuring a first pH level of the media until the first pH level of the media is greater than 7.8;
g) obtaining a first inoculum;
h) introducing the first inoculum to the media in the bioreactor tank;
i) recirculating the media within the bioreactor tank;
j) measuring a first initial $NH_3$—N level of the media;
k) measuring a first initial $NO_2/NO_3$ level of the media;
l) recirculating the media within the bioreactor tank;
m) measuring a second pH level of the media;
n) measuring a first current $NH_3$—N level of the media;
o) measuring a first current $NO_2/NO_3$ level of the media;
p) iteratively repeating the steps of recirculating the media within the bioreactor tank, measuring the second pH level of the media, measuring the first current $NH_3$—N level of the media, and measuring the first current $NO_2/NO_3$ level of the media until one of the following occurs: (a) the second pH level of the media is less than 6.5 and the first current $NH_3$—N level of the media is less than the initial $NH_3$—N level of the media, (b) the second pH level of the media is less than 6.5 and the first current $NO_2/NO_3$ level of the media is greater than the initial $NO_2/NO_3$ level of the media, or (c) the media has recirculated for 5 or more days;
q) obtaining a second inoculum;
r) introducing a second inoculum to the media in the bioreactor tank;
s) measuring a second initial NH3-N level of the media;
t) measuring a second initial NO2/NO3 level of the media;
u) recirculating the media within the bioreactor tank;
v) measuring a third pH level of the media;
w) measuring a second current NH3-N level of the media;
x) measuring a second current NO2/NO3 level of the media;
y) obtaining a third inoculum when five days have passed since a previous introduction of inoculum;
z) introducing the third inoculum to the media in the bioreactor tank every fifth day after a previous introduction of inoculum;
aa) iteratively repeating the steps of introducing an inoculum to the media in the bioreactor tank every fifth day after a previous introduction of inoculum, recirculating the media within the bioreactor tank, measuring the third pH level of the media, measuring the second current NH3-N level of the media, and measuring the second current NO2/NO3 level of the media until one of the following occurs: (1) the third pH level of the media is less than 6.5 and the second current NH3-N level of the media is less than the second initial NH3-N level of the media or (2) the third pH level of the media is less than 6.5 and the second current NO2/NO3 level of the media is greater than the second initial NO2/NO3 level of the media;
bb) obtaining a first solution of 15.5% urine in distilled water, having a first solution pH of 7.59';
cc) introducing the first solution of 15.5% urine in distilled water, having a first solution pH of 7.59;
dd) measuring a third initial NH3-N level of the media;
ee) measuring a third initial NO2/NO3 level of the media;
ff) recirculating the media within the bioreactor tank;
gg) measuring a fourth pH level of the media;
hh) measuring a third current NH3-N level of the media;
ii) measuring a third current NO2/NO3 level of the media;
jj) iteratively repeating the steps of recirculating the media within the bioreactor tank; measuring the fourth pH level of the media, measuring the third current NH3-N level of the media, and measuring the third current NO2/NO3 level of the media until one of the following occurs: (1) the fourth pH level of the media is less than 6.5 and the third current NH3-N level of the media is less than the third initial NH3-N level of the media or (2) the fourth pH level of the media is less than 6.5 and the third current NO2/NO3 level of the media is greater than the third initial NO2/NO3 level of the media;
kk) obtaining a second solution of 15.5% urine in distilled water, having a second solution pH of 5.05;
ll) introducing the second solution of 15.5% urine in distilled water, having a second solution pH of 5.05 to the media;
mm) measuring a fourth initial NH3-N level of the media;
nn) measuring a fourth initial NO2/NO3 level of the media;
oo) recirculating the media within the bioreactor tank;
pp) measuring a fifth pH level of the media;
qq) measuring a fourth current NH3-N level of the media;
rr) measuring a fourth current NO2/NO3 level of the media;
ss) iteratively repeating the steps of recirculating the media within the bioreactor tank, measuring the fifth pH level of the media, measuring the fourth current NH3-N level of the media, and measuring the fourth current NO2/NO3 level of the media until one of the following occurs: (1) the fifth pH level of the media is less than 6.5 and the fourth current NH3-N level of the media is less than the fourth initial NH3-N level of the media or (2) the fifth pH level of the media is less than 6.5 and the fourth current NO2/NO3 level of the media is greater than the fourth initial NO2/NO3 level of the media;
tt) obtaining a third solution of 15.5% urine in distilled water, having a third solution pH of 3.79;
uu) introducing the third solution of 15.5% urine in distilled water, having a third solution pH of 3.79 to the media;
vv) measuring a fifth initial NH3-N level of the media;
ww) measuring a fifth initial NO2/NO3 level of the media;
xx) recirculating the media within the bioreactor tank;
yy) measuring a sixth pH level of the media;
zz) measuring a fifth current NH3-N level of the media;
aaa) measuring a fifth current NO2/NO3 level of the media;
bbb) iteratively repeating the steps of recirculating the media within the bioreactor tank, measuring the sixth pH level of the media, measuring the fifth current NH3-N level of the media, and measuring the fifth current NO2/NO3 level of the media until one of the following occurs: (1) the sixth pH level of the media is less than 6.5 and the fifth current NH3-N level of the media is less than the fifth initial NH3-N level of the media or (2) the sixth pH level of the media is less than 6.5 and the fifth current NO2/NO3 level of the media is greater than the fifth initial NO2/NO3 level of the media; and
ccc) introducing a wastewater stream to the bioreactor tank, wherein the wastewater stream has a wastewater pH of 3.79.

In one embodiment, the second inoculum may have a volume of 25% of a bioreactor tank volume.

In one embodiment, the first inoculum may contain no particles larger than 250 micrometers.

In one embodiment, chemical analysis may be required to show active nitrification prior to introducing the first inoculum.

BRIEF DESCRIPTION OF THE DRAWINGS

FIGS. 1A-1I are a flowchart of the inventive method according to one embodiment of the invention.

FIG. 2 is a flowchart of the inventive method according to another embodiment of the invention.

DETAILED DESCRIPTION OF THE INVENTION

Figures 1A, 1B:
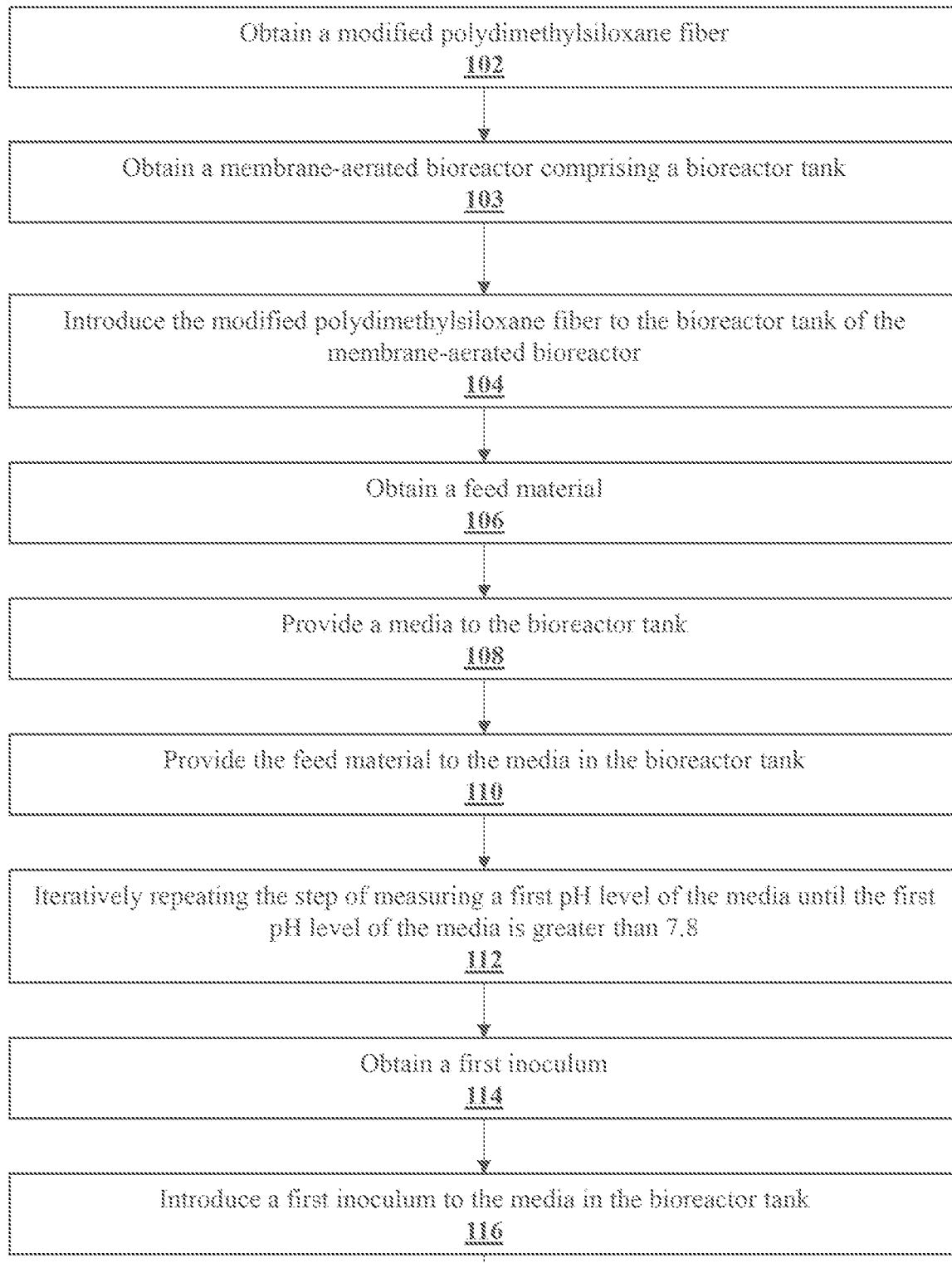
Figure 1B:
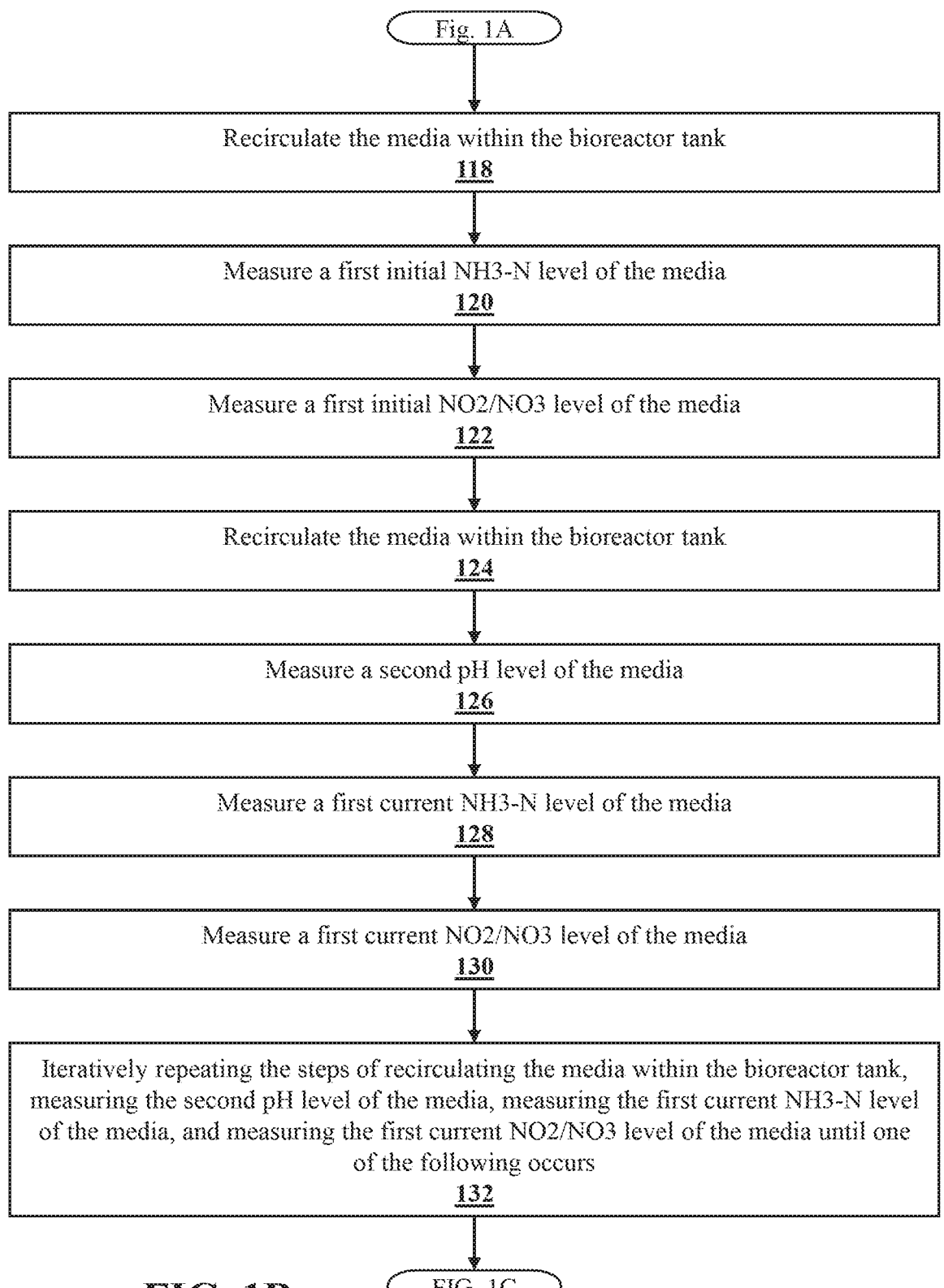
Figure 1C:
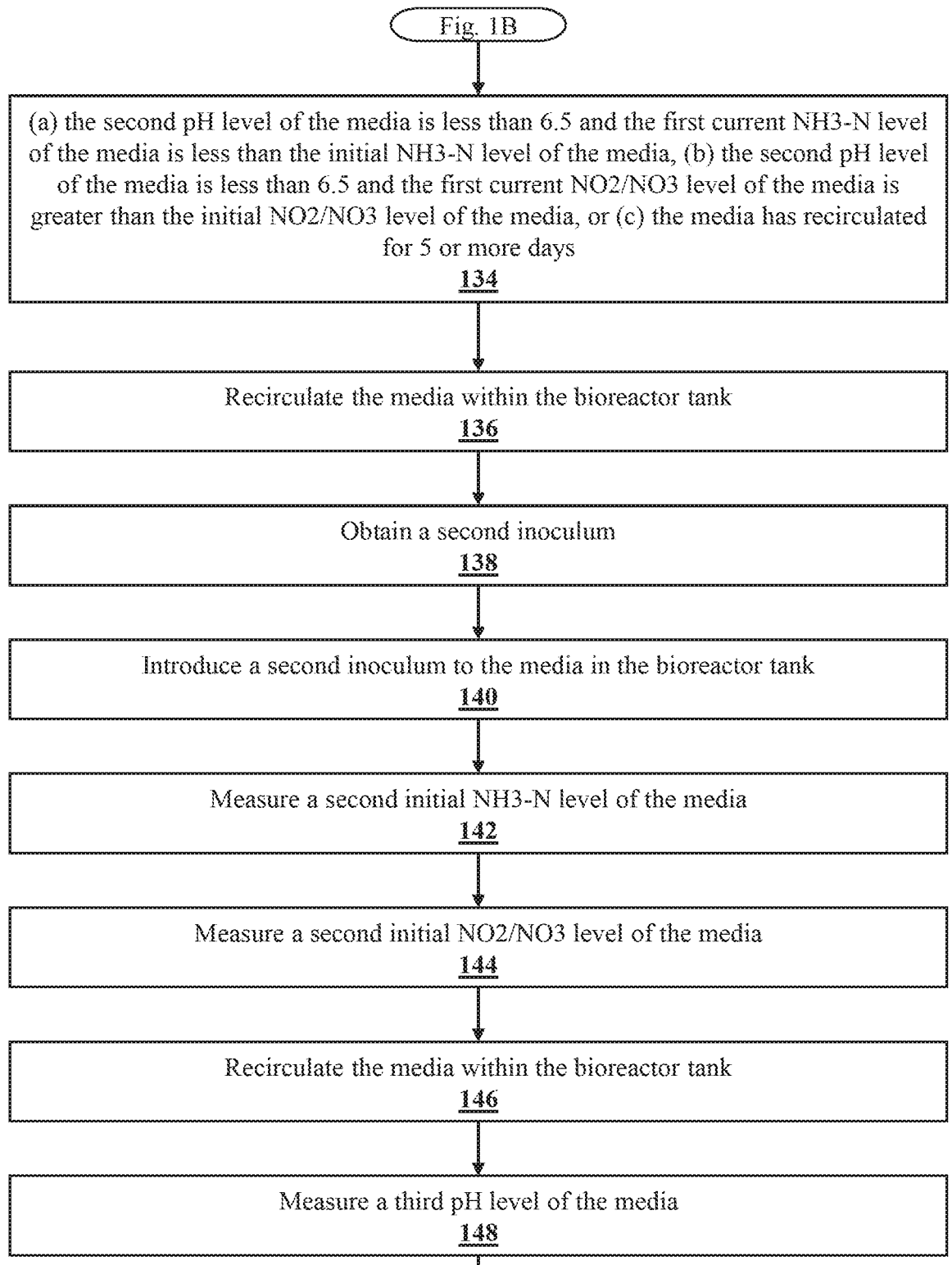
Figure 1D:
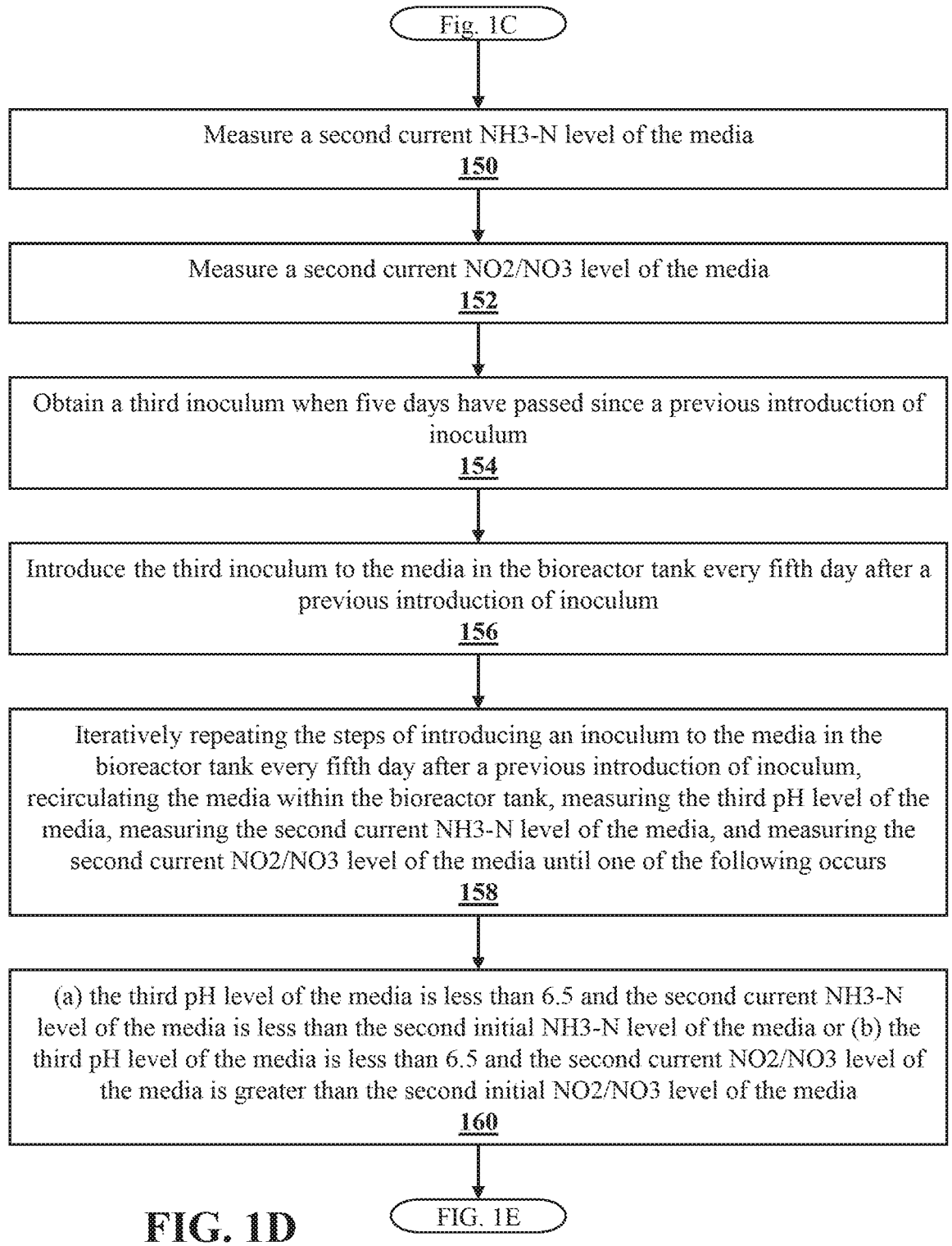
Figure 1H:
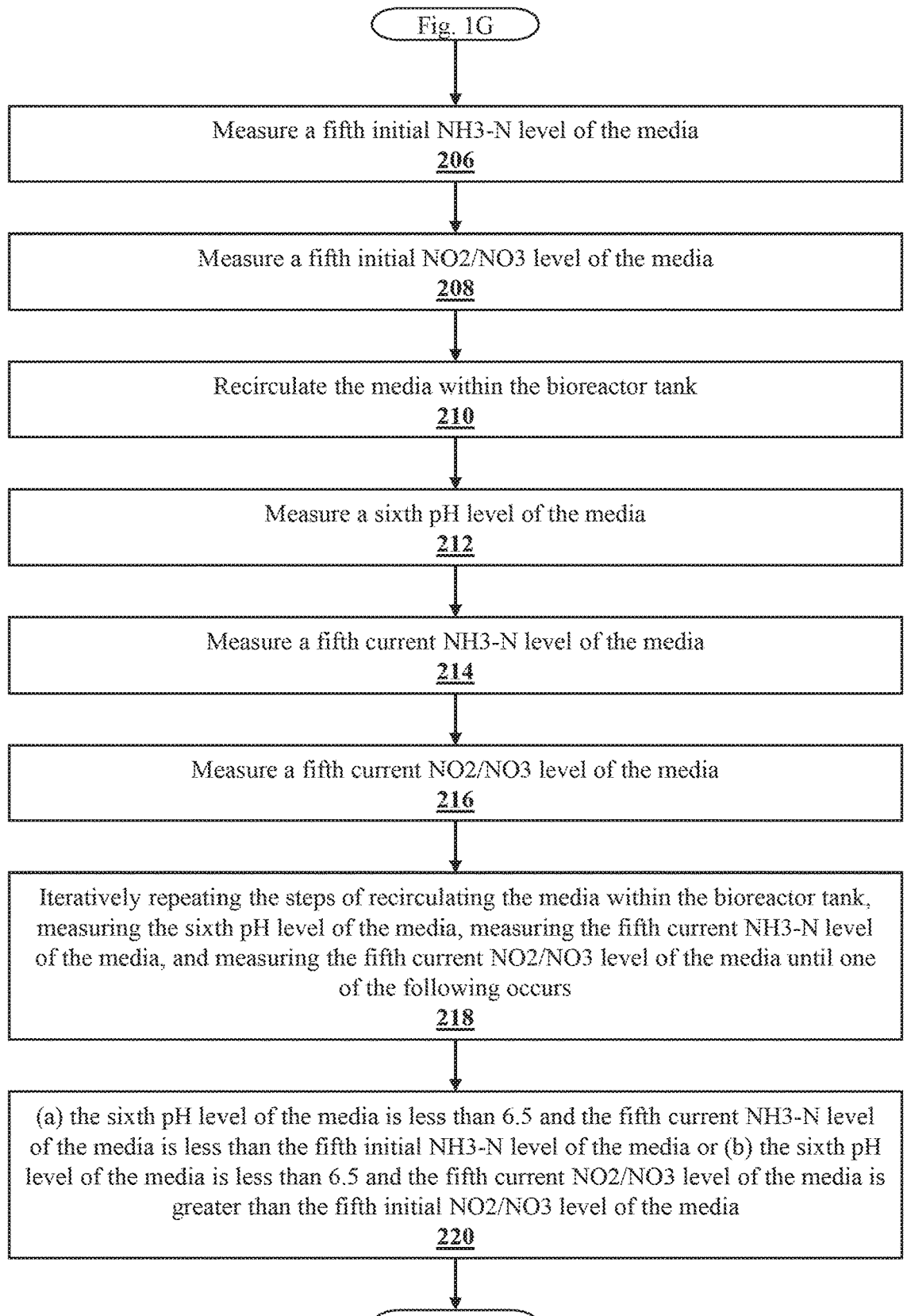
Figure 1I:
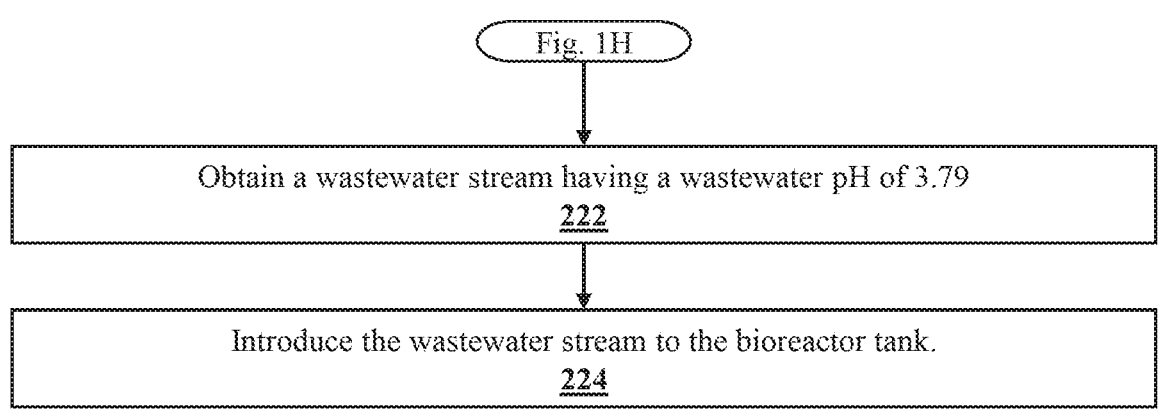

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides an apparatus for hollow fiber treatment for microbial attachment and a method of using and creating same. The method of creating the apparatus is inexpensive, uses readily available chemicals, can be easily scaled and, compared to existing methods, does not require specialized facilities. This method may be performed without protein co-spinning or an electron beam gun active site addition.

The inventive method of creating the apparatus may employ a variety of fiber treatments applied to polydimethylsiloxane (PDMS) fibers 101. These treatments may include, but are not limited to, chemical and mechanical alterations. Chemical treatments may include, but are not limited to, fiber etching, surface modification (also referred to as coating treatments, which may include the application of alternate polymers), or the like. Fiber etching may include, but is not limited to, exposures to hydrofluoric acid (HF), sulfuric acid, hydrogen peroxide, sodium-based etching solutions, including, but not limited to, FluoroEtch® solution (FE), piranha etch solution (PE), or the like. In one embodiment, the etchant may be a solution ranging from 3 parts sulfuric acid, 1 part 30% hydrogen peroxide solution to seven parts sulfuric acid, 1 part 30% hydrogen peroxide solution. In one embodiment, the hydrofluoric acid may be a 3% solution. In one embodiment, the etching may be accomplished using a sodium etchant, such as FluoroEtch®. The exposure to the chemicals may be for varied lengths of time. Coating treatments may include deposition of a thin layer, which may be, but is not limited to, polyacrylic acid, polystyrene, or the like.

Figure 3A:
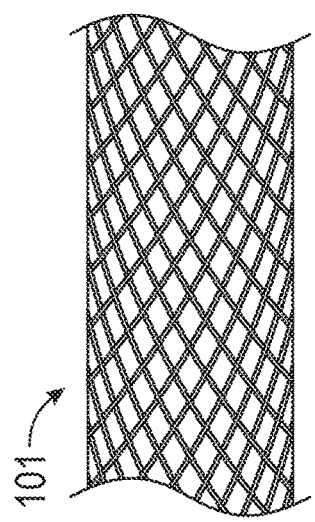
FIG. 3A depicts a fiber modification resulting from a five (5) second exposure to a piranha etch solution.
Figure 3B:
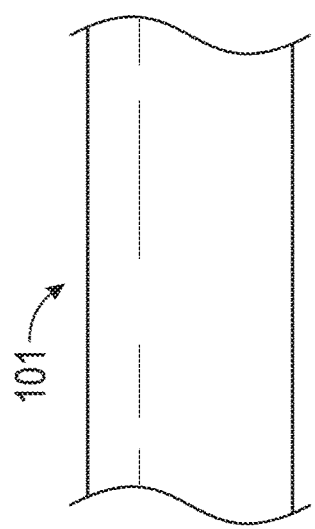
FIG. 3B depicts a fiber modification resulting from sanding with 1500 grit sand paper.
Figure 3C:
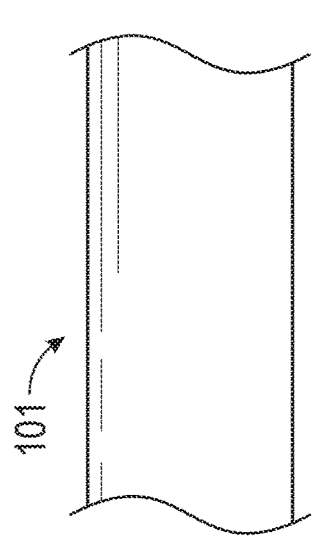
FIG. 3C depicts a fiber modification resulting from application of cable sheaths.
Figure 3D:
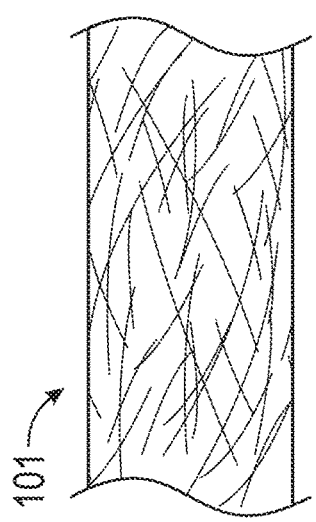
FIG. 3D depicts a fiber modification resulting from application of cotton thread.
Figure 3E:
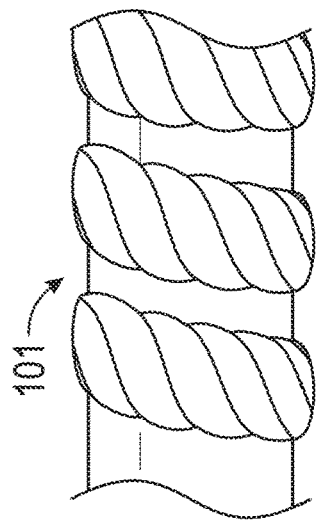
FIG. 3E depicts a fiber modification resulting from application of silk thread.
Figure 3F:
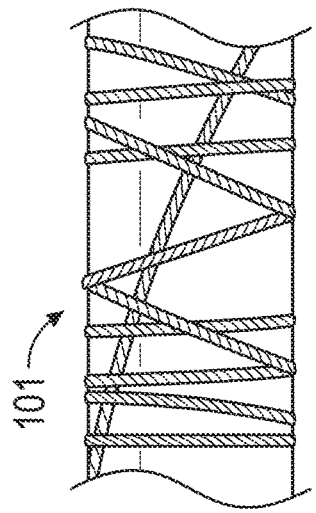
FIG. 3F depicts a fiber modification resulting from application of spider silk.

Mechanical treatments may include, but are not limited to, physical abrasion of the fiber, the use of scaffolding materials, or the like. In embodiments in which the fiber is abraded, the abrasion may be performed by various grit sandpapers or the like. Scaffolding material may include, but is not limited to, nylon cable sheaths, silk thread, cotton thread, spider silk, or the like. All of these treatments may be applied to bulk quantities of fiber material at a low cost compared to many of the treatment methods described in the prior art. FIGS. 3A-3F depict various fiber modifications.

The modified fibers 101 may be utilized in the inventive method of establishing a wastewater bioreactor environment. The fibers may facility the growth of inoculum necessary to operation of the bioreactor. In one embodiment of the inventive method 100 of establishing a bioreactor, a membrane aerated bioreactor may be obtained (step 103). The membrane aerated bioreactor may include a bioreactor tank, which may be adapted to carry a variety of inocula and media.

A variety of microbial inocula may be applied to the modified fibers. Inocula may include, but are not limited to, effluent from a single-stage carbon oxidation-nitrification reactor (R3), effluent from a single-stage MABR reactor system (TTU), septic tank fluid, or the like. A chemical profile for exemplary inocula is presented in Table 1.

TABLE 1

| Inocula profiles | | | |
|---|---|---|---|
| Sample | Ammonium (ppm) | Nitrite (ppm) | Nitrate (ppm) |
| R3 Inoculum | 375.4351 | 866.7076 | 2.3864 |
| TTU Inoculum | 90.8764 | 144.7011 | 4.8872 |
| Septic Inoculum | 102.4612 | 58.6871 | 12.3482 |

Any inocula may be applied to any chemically or mechanically modified fiber, or to any fiber having any combination of chemical and mechanical modifications. In one embodiment, the TTU, R3, or septic tank fluid inoculum may be applied to fibers treated with FE for 18 seconds or with HF for 12 seconds. The inocula may be applied directly to the fibers or may be applied to the fibers because both the inoculum and the fibers are placed in in a bioreactor tank.

The inventive method of treating the fiber and introducing microbial inocula may promote rapid biofilm attachment to the fiber and establish a membrane aerated bioreactor (MABR) system. After the introduction of the inocula to the tank, nitrification may be induced by lowering the pH to below 8.0, a more habitable environment for nitrifying bacteria.

PDMS fibers may be utilized and modified for use in an MABR system because of their many advantages including, but not limited to, high oxygen permeation, superior mechanical/chemical resistance, ability to tolerate higher intramembrane pressures, and the like.

The inventive method may use a PDMS fiber chemically modified by exposure to FE for 18 seconds. This fiber may be introduced to a 1.8-L subscale membrane aerated bioreactor (ssMABR). The ssMABR may be subject to a rapid startup procedure, which is depicted in Table 2 to establish an MABR system.

Once the pH level is greater than 7.8, a first inoculum may be obtained (step 114) and introduced to the media in the bioreactor tank (step 116). After the inoculum has been added, the media in the bioreactor may be recirculated (step 118). An initial NH3-N level of the media may be obtained (step 120). An initial NO2/NO3 level of the media may also be obtained (step 122). The inoculum may continue to be recirculated (step 124). A second pH level of the media may be measured (step 126). Additionally, a current NH3-N level of the media may be measured (step 128), as well as a current NO2/NO3 level of the media (step 130). The media may be iteratively recirculated with the pH level, NH3-N level, and NO2/NO3 level measured (step 132). This reiteration may cease when (a) the pH level of the media is less than 6.5 and the NH3-N level of the media has decreased, (b) the pH level of the media is less than 6.5 and the NO2/NO3 level of the media has increased, or (c) the media has recirculated for 5 or more days (step 134).

The media may continue to recirculate (step 136). A second inoculum may be obtained (step 138) and introduced to the media in the bioreactor tank (step 140). A second NH3-N level may be measured (step 142) along with a second NO2/NO3 level (step 144). The media may be recirculated within the bioreactor tanks (step 146) and a pH level of the media may be measured (step 148). Another NH3-N level may be measured (step 150) as well as a

TABLE 2

Rapid startup procedure

| Step | Operation Description | Completion Criteria |
|---|---|---|
| 0 | Feed active inoculum tank. | |
| 1 | Ensure inoculum tank has handled the feed | pH > 7.8 and chemical analysis shows active nitrification |
| 2 | Inoculate reactor with freshly fed and filtered (250 um) inoculum | |
| 3 | Set reactor to recirculation mode (no feed) | pH < 6.5 and decrease in $NH_3$—N; or pH < 6.5 and increase in $NO_2/NO_3$; or 5 days have elapsed |
| 4 | Re-inoculate reactor with 25% reactor volume of inoculum | pH < 6.5 and decrease in $NH_3$—N proceed to step 5; or pH < 6.5 and increase in $NO_2/NO_3$ proceed to step 5; or 5 days have elapsed, repeat step 4 |
| 5 | Feed 15.5% urine in DI water at 7.59-day θ | pH < 6.5 and decrease in $NH_3$—N or pH < 6.5 and increase in $NO_2/NO_3$ |
| 6 | Feed 15.5% urine in DI water at 5.05-day θ | pH < 6.5 and decrease in $NH_3$—N or pH < 6.5 and increase in $NO_2/NO_3$ |
| 7 | Feed 15.5% urine in DI water at 3.79-day θ | pH < 6.5 and decrease in $NH_3$—N or pH < 6.5 and increase in $NO_2/NO_3$ |
| 8 | Full strength wastewater stream at 3.79-day θ | Startup complete. |

In one embodiment, the membrane aerated bioreactor (MABR) system may be established by using an ssMABR containing PDMS fibers, which have been subjected to a sodium etchant, such as FlouroEtch®, and subject to the rapid startup procedure of Table 2. This may result in a fast starting bioreactor with full wastewater feed no later than day 25 of operation.

To establish a wastewater bioreactor environment, a polydimethylsiloxane fiber may be obtained (step 102) and introduced to the bioreactor tank (step 104). In some embodiments, the polydimethylsiloxane fiber may be modified prior to introducing it to the bioreactor tank (step 105). A media may be provided to the bioreactor tank (step 108). A feed material may be obtained (step 106) and provided to the media (step 110). A first pH level of the media may be iteratively measured until the first pH level is greater than 7.8 (step 112).

NO2/NO3 level (step 152). A third inoculum may be obtained (step 154) and introduced to the media after five days have elapsed from the prior introduction of inoculum to the media (step 156). The steps of recirculating, measuring the pH level, NH3-N level, NO2/NO3 level, and introducing a third inoculum to the media may be iteratively repeated (step 158) until one of the following events occurs: (a) the pH level of the media is less than 6.5 and the NH3-N level has decreased or (b) the pH level of the media is less than 6.5 and the NO2/NO3 level of the media has increased (step 160).

A solution of 15.5% urine in distilled water, having a pH of 7.59 may be obtained (step 162) and introduced to the media (step 164). A NH3-N level of the media may be measured (step 166) along with a NO2/NO3 level of the media (step 168). The media may be recirculated within the bioreactor tank (step 170). A pH level of the media may be measured (step 172). Another NH3-N level may be measured (step 174) along with a NO2/NO3 level (step 176). The media may be iteratively recirculated, the pH level, NH3-N level and NO2/NO3 level of the media may be iteratively measured (step 178) until one of the following events occurs: (a) the pH level of the media is less than 6.5 and the NH3-N level has decreased or (b) the pH level is less than 6.5 and the NO2/NO3 level has increased (step 180).

A solution of 15.5% urine in distilled water, having a pH of 5.05 may be obtained (step 182) and introduced to the media (step 184). A NH3-N level of the media may be measured (step 186) along with a NO2/NO3 level of the media (step 188). The media may be recirculated within the bioreactor tank (step 190). A pH level of the media may be measured (step 192). Another NH3-N level may be measured (step 194) along with a NO2/NO3 level (step 196). The media may be iteratively recirculated, the pH level, NH3-N level and NO2/NO3 level of the media may be iteratively measured (step 198) until one of the following events occurs: (a) the pH level of the media is less than 6.5 and the NH3-N level has decreased or (b) the pH level is less than 6.5 and the NO2/NO3 level has increased (step 200).

A solution of 15.5% urine in distilled water, having a pH of 3.79 may be obtained (step 202) and introduced to the media (step 204). A NH3-N level of the media may be measured (step 206) along with a NO2/NO3 level of the media (step 208). The media may be recirculated within the bioreactor tank (step 210). A pH level of the media may be measured (step 212). Another NH3-N level may be measured (step 214) along with a NO2/NO3 level (step 216). The media may be iteratively recirculated, the pH level, NH3-N level and NO2/NO3 level of the media may be iteratively measured (step 218) until one of the following events occurs: (a) the pH level of the media is less than 6.5 and the NH3-N level has decreased or (b) the pH level is less than 6.5 and the NO2/NO3 level has increased (step 220).

A wastewater stream having a pH of 3.79 may be obtained (step 222) and introduced to the bioreactor tank (step 224).

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the description of the invention. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

That which is claimed is:

1. A method for establishing a wastewater bioreactor environment comprising the steps of:
   obtaining a membrane-aerated bioreactor comprising a bioreactor tank;
   obtaining a polydimethylsiloxane fiber;
   introducing the polydimethylsiloxane fiber to the bioreactor tank;
   obtaining a feed material;
   providing a media to the bioreactor tank;
   introducing the feed to the media carried in the bioreactor tank;
   iteratively repeating the step of measuring a first pH level of the media until the first pH level of the media is greater than 7.8;
   obtaining a first inoculum;
   introducing the first inoculum to the media in the bioreactor tank;
   recirculating the media within the bioreactor tank;
   measuring a first initial $NH_3$-N level of the media;
   measuring a first initial $NO_2/NO_3$ level of the media;
   recirculating the media within the bioreactor tank;
   measuring a second pH level of the media;
   measuring a first current $NH_3$-N level of the media;
   measuring a first current $NO_2/NO_3$ level of the media;
   iteratively repeating the steps of recirculating the media within the bioreactor tank, measuring the second pH level of the media, measuring the first current $NH_3$-N level of the media, and measuring the first current $NO_2/NO_3$ level of the media until one of the following occurs: (a) the second pH level of the media is less than 6.5 and the first current $NH_3$-N level of the media is less than the initial $NH_3$-N level of the media, (b) the second pH level of the media is less than 6.5 and the first current $NO_2/NO_3$ level of the media is greater than the initial $NO_2/NO_3$ level of the media, or (c) the media has recirculated for 5 or more days;
   obtaining a second inoculum;
   introducing the second inoculum to the media in the bioreactor tank;
   measuring a second initial $NH_3$-N level of the media;
   measuring a second initial $NO_2/NO_3$ level of the media;
   recirculating the media within the bioreactor tank;
   measuring a third pH level of the media;
   measuring a second current $NH_3$-N level of the media;
   measuring a second current $NO_2/NO_3$ level of the media;
   obtaining a third inoculum;
   introducing the third inoculum to the media in the bioreactor tank every fifth day after a previous introduction of inoculum;
   iteratively repeating the steps of introducing an inoculum to the media in the bioreactor tank every fifth day after a previous introduction of inoculum, recirculating the media within the bioreactor tank, measuring the third pH level of the media, measuring the second current $NH_3$-N level of the media, and measuring the second current $NO_2/NO_3$ level of the media until one of the following occurs: (a) the third pH level of the media is less than 6.5 and the second current $NH_3$-N level of the media is less than the second initial $NH_3$-N level of the media or (b) the third pH level of the media is less than 6.5 and the second current $NO_2/NO_3$ level of the media is greater than the second initial $NO_2/NO_3$ level of the media;
obtaining a first solution of 15.5% urine in distilled water, having a first solution pH of 7.59;
introducing the first solution of 15.5% urine in distilled water, having a first solution pH of 7.59 to the media;
measuring a third initial $NH_3$-N level of the media;
measuring a third initial $NO_2/NO_3$ level of the media;
recirculating the media within the bioreactor tank;
measuring a fourth pH level of the media;
measuring a third current $NH_3$-N level of the media;
measuring a third current $NO_2/NO_3$ level of the media;
iteratively repeating the steps of recirculating the media within the bioreactor tank: measuring the fourth pH level of the media, measuring the third current $NH_3$-N level of the media, and measuring the third current $NO_2/NO_3$ level of the media until one of the following occurs: (a) the fourth pH level of the media is less than 6.5 and the third current $NH_3$-N level of the media is less than the third initial $NH_3$-N level of the media or (b) the fourth pH level of the media is less than 6.5 and the third current $NO_2/NO_3$ level of the media is greater than the third initial $NO_2/NO_3$ level of the media;
obtaining a second solution of 15.5% urine in distilled water, having a second solution pH of 5.05
introducing the second solution of 15.5% urine in distilled water, having a second solution pH of 5.05 to the media;
measuring a fourth initial $NH_3$-N level of the media;
measuring a fourth initial $NO_2/NO_3$ level of the media;
recirculating the media within the bioreactor tank;
measuring a fifth pH level of the media;
measuring a fourth current $NH_3$-N level of the media;
measuring a fourth current $NO_2/NO_3$ level of the media;
iteratively repeating the steps of recirculating the media within the bioreactor tank, measuring the fifth pH level of the media, measuring the fourth current $NH_3$-N level of the media, and measuring the fourth current $NO_2/NO_3$ level of the media until one of the following occurs: (a) the fifth pH level of the media is less than 6.5 and the fourth current $NH_3$-N level of the media is less than the fourth initial $NH_3$-N level of the media or (b) the fifth pH level of the media is less than 6.5 and the fourth current $NO_2/NO_3$ level of the media is greater than the fourth initial $NO_2/NO_3$ level of the media;
obtaining a third solution of 15.5% urine in distilled water, having a third solution pH of 3.79;
introducing a third solution of 15.5% urine in distilled water, having a third solution pH of 3.79 to the media;
measuring a fifth initial $NH_3$-N level of the media;
measuring a fifth initial $NO_2/NO_3$ level of the media;
recirculating the media within the bioreactor tank;
measuring a sixth pH level of the media;
measuring a fifth current $NH_3$-N level of the media;
measuring a fifth current $NO_2/NO_3$ level of the media;
iteratively repeating the steps of recirculating the media within the bioreactor tank, measuring the sixth pH level of the media, measuring the fifth current $NH_3$-N level of the media, and measuring the fifth current $NO_2/NO_3$ level of the media until one of the following occurs: (a) the sixth pH level of the media is less than 6.5 and the fifth current $NH_3$-N level of the media is less than the fifth initial $NH_3$-N level of the media or (b) the sixth pH level of the media is less than 6.5 and the fifth current $NO_2/NO_3$ level of the media is greater than the fifth initial $NO_2/NO_3$ level of the media;
obtaining a wastewater stream having a wastewater pH of 3.79; and
introducing the wastewater stream to the media in the bioreactor tank.

2. The method of claim 1 wherein the polydimethylsiloxane fiber is hollow.

3. The method of claim 1 further comprising the step of:
mechanically abrading the polydimethylsiloxane fiber prior to introducing it to the bioreactor tank.

4. The method of claim 1 further comprising the step of:
etching the polydimethylsiloxane fiber prior to introducing it to the bioreactor tank.

5. The method of claim 4 wherein the etching is performed using one or more hydrofluoric acid, sulfuric acid, sodium-based solution, or hydrogen peroxide.

6. The method of claim 1 further comprising the step of:
coating a polydimethylsiloxane fiber to create a modified polydimethylsiloxane fiber.

7. The method of claim 1 further comprising the step of:
applying a scaffolding material to a polydimethylsiloxane fiber to create the modified polydimethylsiloxane fiber.

8. The method of claim 7 wherein the scaffolding material is nylon cable sheaths, silk thread, cotton thread, or spider silk.

9. The method according to claim 1 wherein the second inoculum has a volume of 25% of a bioreactor tank volume.

10. The method according the claim 1 wherein the first inoculum contains no particles larger than 250 micrometers.

11. The method according to claim 1 further comprising the step of ensuring a chemical analysis show active nitrification prior to introducing the first inoculum.

12. A method for establishing a wastewater bioreactor environment comprising the steps of:
obtaining a membrane-aerated bioreactor comprising a bioreactor tank;
obtaining a modified polydimethylsiloxane fiber;
introducing the modified polydimethylsiloxane fiber to the bioreactor tank of the membrane-aerated bioreactor;
obtaining a feed material;
providing a media to the bioreactor tank;
providing the feed material to the media in the bioreactor tank;
iteratively repeating the step of measuring a first pH level of the media until the first pH level of the media is greater than 7.8;
obtaining a first inoculum;
introducing a first inoculum to the media in the bioreactor tank;
recirculating the media within the bioreactor tank;
measuring a first initial $NH_3$-N level of the media;
measuring a first initial $NO_2/NO_3$ level of the media;
recirculating the media within the bioreactor tank;
measuring a second pH level of the media;
measuring a first current $NH_3$-N level of the media;
measuring a first current $NO_2/NO_3$ level of the media;
iteratively repeating the steps of recirculating the media within the bioreactor tank, measuring the second pH level of the media, measuring the first current $NH_3$-N level of the media, and measuring the first current $NO_2/NO_3$ level of the media until one of the following occurs: (a) the second pH level of the media is less than 6.5 and the first current $NH_3$-N level of the media is less than the initial $NH_3$-N level of the media, (b) the second pH level of the media is less than 6.5 and the first current $NO_2/NO_3$ level of the media is greater than the initial $NO_2/NO_3$ level of the media, or (c) the media has recirculated for 5 or more days;
recirculating the media within the bioreactor tank;
obtaining a second inoculum;
introducing a second inoculum to the media in the bioreactor tank;
measuring a second initial $NH_3$-N level of the media;
measuring a second initial $NO_2/NO_3$ level of the media;
recirculating the media within the bioreactor tank;
measuring a third pH level of the media;
measuring a second current $NH_3$-N level of the media;
measuring a second current $NO_2/NO_3$ level of the media;
obtaining a third inoculum when five days have passed since a previous introduction of inoculum;
introducing the third inoculum to the media in the bioreactor tank every fifth day after a previous introduction of inoculum;
iteratively repeating the steps of introducing an inoculum to the media in the bioreactor tank every fifth day after a previous introduction of inoculum, recirculating the media within the bioreactor tank, measuring the third pH level of the media, measuring the second current $NH_3$-N level of the media, and measuring the second current $NO_2/NO_3$ level of the media until one of the following occurs: (a) the third pH level of the media is less than 6.5 and the second current $NH_3$-N level of the media is less than the second initial $NH_3$-N level of the media or (b) the third pH level of the media is less than 6.5 and the second current $NO_2/NO_3$ level of the media is greater than the second initial $NO_2/NO_3$ level of the media;
obtaining a first solution of 15.5% urine in distilled water, having a first solution pH of 7.59;
introducing the first solution of 15.5% urine in distilled water, having a first solution pH of 7.59 to the media;
measuring a third initial $NH_3$-N level of the media;
measuring a third initial $NO_2/NO_3$ level of the media;
recirculating the media within the bioreactor tank;
measuring a fourth pH level of the media;
measuring a third current $NH_3$-N level of the media;
measuring a third current $NO_2/NO_3$ level of the media;
iteratively repeating the steps of recirculating the media within the bioreactor tank, measuring the fourth pH level of the media, measuring the third current $NH_3$-N level of the media, and measuring the third current $NO_2/NO_3$ level of the media until one of the following occurs: (a) the fourth pH level of the media is less than 6.5 and the third current $NH_3$-N level of the media is less than the third initial $NH_3$-N level of the media or (b) the fourth pH level of the media is less than 6.5 and the third current $NO_2/NO_3$ level of the media is greater than the third initial $NO_2/NO_3$ level of the media;
obtaining a second solution of 15.5% urine in distilled water, having a second solution pH of 5.05;
introducing the second solution of 15.5% urine in distilled water, having a second solution pH of 5.05 to the media;
measuring a fourth initial $NH_3$-N level of the media;
measuring a fourth initial $NO_2/NO_3$ level of the media;
recirculating the media within the bioreactor tank;
measuring a fifth pH level of the media;
measuring a fourth current $NH_3$-N level of the media;
measuring a fourth current $NO_2/NO_3$ level of the media;
iteratively repeating the steps of recirculating the media within the bioreactor tank, measuring the fifth pH level of the media, measuring the fourth current $NH_3$-N level of the media, and measuring the fourth current $NO_2/NO_3$ level of the media until one of the following occurs: (a) the fifth pH level of the media is less than 6.5 and the fourth current $NH_3$-N level of the media is less than the fourth initial $NH_3$-N level of the media or (b) the fifth pH level of the media is less than 6.5 and the fourth current $NO_2/NO_3$ level of the media is greater than the fourth initial $NO_2/NO_3$ level of the media;
obtaining a third solution of 15.5% urine in distilled water, having a third solution pH of 3.79;
introducing the third solution of 15.5% urine in distilled water, having a third solution pH of 3.79 to the media;
measuring a fifth initial $NH_3$-N level of the media;
measuring a fifth initial $NO_2/NO_3$ level of the media;
recirculating the media within the bioreactor tank;
measuring a sixth pH level of the media;
measuring a fifth current $NH_3$-N level of the media;
measuring a fifth current $NO_2/NO_3$ level of the media;
iteratively repeating the steps of recirculating the media within the bioreactor tank, measuring the sixth pH level of the media, measuring the fifth current $NH_3$-N level of the media, and measuring the fifth current $NO_2/NO_3$ level of the media until one of the following occurs: (a) the sixth pH level of the media is less than 6.5 and the fifth current $NH_3$-N level of the media is less than the fifth initial $NH_3$-N level of the media or (b) the sixth pH level of the media is less than 6.5 and the fifth current $NO_2/NO_3$ level of the media;
obtaining a wastewater stream having a wastewater pH of 3.79; and
introducing the wastewater stream to the bioreactor tank.
13. The method of claim 12 wherein the modified polydimethylsiloxane fiber is hollow.
14. The method of claim 12 further comprising the step of: mechanically abrading a polydimethylsiloxane fiber to create the modified polydimethylsiloxane fiber.
15. The method of claim 12 further comprising the step of: etching a polydimethylsiloxane fiber to create the modified polydimethylsiloxane fiber.
16. The method of claim 12 further comprising the step of: coating a polydimethylsiloxane fiber to create the modified polydimethylsiloxane fiber.
17. The method of claim 12 further comprising the step of: applying a scaffolding material to a polydimethylsiloxane fiber to create the modified polydimethylsiloxane fiber.
18. The method of claim 17 wherein the scaffolding material is nylon cable sheaths, silk thread, cotton thread, or spider silk.
19. A method for establishing a wastewater bioreactor environment comprising the step of:
obtaining a polydimethylsiloxane fiber;
modifying the polydimethylsiloxane fiber by mechanically abrasion, etching, coating, or at least partially covering the polydimethylsiloxane fiber with a scaffolding material to create a modified polydimethylsiloxane fiber;
obtaining a membrane-aerated bioreactor comprising a bioreactor tank;
introducing the modified polydimethylsiloxane fiber to the bioreactor tank of the membrane-aerated bioreactor;
obtaining a feed material;
introducing a media to the bioreactor tank;
providing the feed material to the media carried in the bioreactor tank;

iteratively repeating the step of measuring a first pH level of the media until the first pH level of the media is greater than 7.8 and chemical analysis shows active nitrification;
obtaining a first inoculum;
introducing the first inoculum, containing no particles larger than 250 micrometers, to the media in the bioreactor tank;
recirculating the media within the bioreactor tank;
measuring a first initial $NH_3$-N level of the media;
measuring a first initial $NO_2/NO_3$ level of the media;
recirculating the media within the bioreactor tank;
measuring a second pH level of the media;
measuring a first current $NH_3$-N level of the media;
measuring a first current $NO_2/NO_3$ level of the media;
iteratively repeating the steps of recirculating the media within the bioreactor tank, measuring the second pH level of the media, measuring the first current $NH_3$-N level of the media, and measuring the first current $NO_2/NO_3$ level of the media until one of the following occurs: (a) the second pH level of the media is less than 6.5 and the first current $NH_3$-N level of the media is less than the initial $NH_3$-N level of the media, (b) the second pH level of the media is less than 6.5 and the first current $NO_2/NO_3$ level of the media is greater than the initial $NO_2/NO_3$ level of the media, or (c) the media has recirculated for 5 or more days;
obtaining a second inoculum;
introducing the second inoculum, having a volume of 25% of a bioreactor tank volume, to the media in the bioreactor tank;
measuring a second initial $NH_3$-N level of the media;
measuring a second initial $NO_2/NO_3$ level of the media;
recirculating the media within the bioreactor tank;
measuring a third pH level of the media;
measuring a second current $NH_3$-N level of the media;
measuring a second current $NO_2/NO_3$ level of the media;
iteratively repeating the steps of introducing an inoculum to the media in the bioreactor tank every fifth day after a previous introduction of inoculum, recirculating the media within the bioreactor tank, measuring the third pH level of the media, measuring the second current $NH_3$-N level of the media, and measuring the second current $NO_2/NO_3$ level of the media until one of the following occurs: (a) the third pH level of the media is less than 6.5 and the second current $NH_3$-N level of the media is less than the second initial $NH_3$-N level of the media or (b) the third pH level of the media is less than 6.5 and the second current $NO_2/NO_3$ level of the media is greater than the second initial $NO_2/NO_3$ level of the media;
obtaining a first solution of 15.5% urine in distilled water, having a first solution pH of 7.59 to the media;
introducing the first solution of 15.5% urine in distilled water, having a first solution pH of 7.59;
measuring a third initial $NH_3$-N level of the media;
measuring a third initial $NO_2/NO_3$ level of the media;
recirculating the media within the bioreactor tank;
measuring a fourth pH level of the media;
measuring a third current $NH_3$-N level of the media;
measuring a third current $NO_2/NO_3$ level of the media;
iteratively repeating the steps of recirculating the media within the bioreactor tank, measuring the fourth pH level of the media, measuring the third current $NH_3$-N level of the media, and measuring the third current $NO_2/NO_3$ level of the media until one of the following occurs: (a) the fourth pH level of the media is less than 6.5 and the third current $NH_3$-N level of the media is less than the third initial $NH_3$-N level of the media or (b) the fourth pH level of the media is less than 6.5 and the third current $NO_2/NO_3$ level of the media is greater than the third initial $NO_2/NO_3$ level of the media;
obtaining a second solution of 15.5% urine in distilled water, having a second solution pH of 5.05;
introducing the second solution of 15.5% urine in distilled water, having a second solution pH of 5.05 to the media;
measuring a fourth initial $NH_3$-N level of the media;
measuring a fourth initial $NO_2/NO_3$ level of the media;
recirculating the media within the bioreactor tank;
measuring a fifth pH level of the media;
measuring a fourth current $NH_3$-N level of the media;
measuring a fourth current $NO_2/NO_3$ level of the media;
iteratively repeating the steps of recirculating the media within the bioreactor tank, measuring the fifth pH level of the media, measuring the fourth current $NH_3$-N level of the media, and measuring the fourth current $NO_2/NO_3$ level of the media until one of the following occurs: (a) the fifth pH level of the media is less than 6.5 and the fourth current $NH_3$-N level of the media is less than the fourth initial $NH_3$-N level of the media or (b) the fifth pH level of the media is less than 6.5 and the fourth current $NO_2/NO_3$ level of the media is greater than the fourth initial $NO_2/NO_3$ level of the media;
obtaining a third solution of 15.5% urine in distilled water, having a third solution pH of 3.79;
introducing the third solution of 15.5% urine in distilled water, having a third solution pH of 3.79 to the media;
measuring a fifth initial $NH_3$-N level of the media;
measuring a fifth initial $NO_2/NO_3$ level of the media;
recirculating the media within the bioreactor tank;
measuring a sixth pH level of the media;
measuring a fifth current $NH_3$-N level of the media;
measuring a fifth current $NO_2/NO_3$ level of the media;
iteratively repeating the steps of recirculating the media within the bioreactor tank, measuring the sixth pH level of the media, measuring the fifth current $NH_3$-N level of the media, and measuring the fifth current $NO_2/NO_3$ level of the media until one of the following occurs: (a) the sixth pH level of the media is less than 6.5 and the fifth current $NH_3$-N level of the media is less than the fifth initial $NH_3$-N level of the media or (b) the sixth pH level of the media is less than 6.5 and the fifth current $NO_2/NO_3$ level of the media is greater than the fifth initial $NO_2/NO_3$ level of the media;
obtaining a wastewater stream, having a wastewater pH of 3.79; and
introducing the wastewater stream to the bioreactor tank.

* * * * *